United States Patent
Li et al.

(10) Patent No.: US 10,901,144 B2
(45) Date of Patent: Jan. 26, 2021

(54) LIGHT GUIDING STRUCTURE, DISPLAY DEVICE AND METHOD OF USING THE SAME

(71) Applicants: CHENGDU BOE OPTOELECTRONICS TECHNOLOGY CO., LTD., Chengdu (CN); BOE TECHNOLOGY GROUP CO., LTD., Beijing (CN)

(72) Inventors: Fei Li, Beijing (CN); Binfeng Feng, Beijing (CN); Qifeng Li, Beijing (CN); Yonghui Luo, Beijing (CN); Chao Wang, Beijing (CN); Ying Liu, Beijing (CN); Hairui Zhao, Beijing (CN); Yupeng Chen, Beijing (CN)

(73) Assignees: CHENGDU BOE OPTOELECTRONICS TECHNOLOGY CO., LTD., Sichuan (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/532,947

(22) Filed: Aug. 6, 2019

(65) Prior Publication Data
US 2020/0209470 A1    Jul. 2, 2020

(30) Foreign Application Priority Data
Jan. 2, 2019    (CN) .......................... 2019 1 0001358

(51) Int. Cl.
*G02B 6/04*    (2006.01)
*G02B 6/32*    (2006.01)
(Continued)

(52) U.S. Cl.
CPC ........... *G02B 6/04* (2013.01); *G02B 6/12004* (2013.01); *G02B 6/1228* (2013.01); *G02B 6/32* (2013.01)

(58) Field of Classification Search
CPC .......... G02B 6/04; G02B 6/32; G02B 6/1228; G02B 6/12004
See application file for complete search history.

(56) References Cited

U.S. PATENT DOCUMENTS 5,862,285 A * 1/1999 Danielian ............ G01N 21/474
                                                    385/116
9,733,427 B2    8/2017 Wu
(Continued)

FOREIGN PATENT DOCUMENTS

CN    101140341 A    3/2008
CN    103969734 A    8/2014
(Continued)

OTHER PUBLICATIONS

First Chinese Office Action dated Dec. 17, 2019.

*Primary Examiner* — Ellen E Kim
(74) *Attorney, Agent, or Firm* — Dilworth & Barrese, LLP.; Michael J. Musella, Esq.

(57) ABSTRACT

A light guiding structure, a display device and a method of using the same are provided. The light guiding structure includes a housing including an opening; and a first optical fiber structure, an image collection module, a second optical fiber structure, and an image compensation module in the housing. The first optical fiber structure is configured to transmit light incident into the opening to the image collection module; and the second optical fiber structure is configured to transmit an image displayed by the image compensation module to the opening. The display device includes the light guiding structure.

20 Claims, 5 Drawing Sheets (51) Int. Cl.
*G02B 6/12* (2006.01)
*G02B 6/122* (2006.01)

(56) References Cited

U.S. PATENT DOCUMENTS

| | | | |
|---|---|---|---|
| 10,331,164 B2 | 6/2019 | Bao | |
| 2004/0108806 A1* | 6/2004 | Cok | H01L 51/5281 |
| | | | 313/504 |
| 2009/0002794 A1* | 1/2009 | Weir | A61B 1/0017 |
| | | | 359/213.1 |
| 2015/0316222 A1* | 11/2015 | Chen | G02B 19/0042 |
| | | | 359/485.01 |
| 2017/0270342 A1* | 9/2017 | He | G06F 3/0418 |
| 2019/0384360 A1 | 12/2019 | Tang | |

FOREIGN PATENT DOCUMENTS

| | | |
|---|---|---|
| CN | 106603772 A | 4/2017 |
| CN | 206741360 U | 12/2017 |
| CN | 207802057 U | 8/2018 |
| CN | 108769301 A | 11/2018 |
| TW | 201837895 A | 10/2018 |

\* cited by examiner

FIG. 7 acquiring an external environment image through a first optical fiber structure, and conducting light incident into a light transmission part of the display device to the image collection module.

transmitting an image displayed by the image compensation module to the light transmission part of the display device through the second optical fiber structure.

FIG. 8

LIGHT GUIDING STRUCTURE, DISPLAY DEVICE AND METHOD OF USING THE SAME

CROSS REFERENCE TO RELATED APPLICATIONS

This application claims the priority of Chinese patent application No. 201910001358.9 entitled "A LIGHT GUIDING STRUCTURE, A DISPLAY DEVICE AND A METHOD OF USING THE SAME" filed to CNIPA on Jan. 2, 2019, the full text of which is incorporated herein by reference.

TECHNICAL FIELD

Embodiments of the present disclosure relate to a light guiding structure, a display device and a method of using the same.

BACKGROUND

With the popularization of full-screen cellphones, televisions and other display products, off-screen camera shooting and off-screen fingerprint technology have also become one of the important characteristics of full-screen logo. However, the light transmittance of ordinary display screen can only meet the functional fields, such as off-screen fingerprint, which have not high requirements for image information. Daily camera shooting has become a main research bottleneck.

SUMMARY

At least one embodiment of the present disclosure provides a light guiding structure, comprising: a housing including an opening; a first optical fiber structure, an image collection module, a second optical fiber structure, and an image compensation module in the housing. The first optical fiber structure is configured to transmit light incident into the opening to the image collection module; and the second optical fiber structure is configured to transmit an image displayed by the image compensation module to the opening.

For example, the image collection module comprises a photosensitive sensor, and the image compensation module comprises an image compensation member.

For example, the first optical filer structure and the second optical fiber structure are provided under the opening of the housing, and the photosensitive sensor and the image compensation member are provided under the opening of the housing at positions beyond both the first optical fiber structure and the second optical fiber structure.

For example, the image collection module comprises a convex lens configured to focus light transmitted by the first optical fiber structure to the photosensitive sensor.

For example, the first optical fiber structure comprises a plurality of first optical fibers, and the second optical fiber structure comprises a plurality of second optical fibers, the plurality of first optical fibers including first ends near the opening and the plurality of second optical fibers including first ends near the opening, all of the first ends being arranged at intervals, and the plurality of first optical fibers includes second ends connected to the photosensitive sensor, and the plurality of second optical fibers includes second ends connected to the image compensation member, respectively.

For example, the first optical fiber structure comprise a plurality of first optical fibers, and the second optical fiber structure comprises a plurality of second optical fibers. Near the opening of the housing, the first ends of the plurality of first optical fibers surround one of the first ends of the plurality of second optical fibers, or the first ends of the plurality of second optical fibers surround one of the first ends of the plurality of first optical fibers, to form a ring arrangement; and the second ends of the plurality of first optical fibers are connected to the photosensitive sensor, and the second ends of the plurality of second optical fibers are connected to the image compensation member.

For example, the image collection module further comprises a convex lens configured to focus light guided by the first optical fiber structure to the photosensitive sensor.

For example, the second ends of the plurality of first optical fibers are bonded to the photosensitive sensor, and the second ends of the plurality of second optical fibers are bonded to the image compensation member.

For example, the second ends of the plurality of first optical fibers are bonded to the photosensitive sensor, and the second ends of the plurality of second optical fibers are bonded to the image compensation member.

For example, the plurality of first optical fibers and the plurality of second optical fibers are arranged regularly, and the first ends of the plurality of first optical fibers and the plurality of second optical fibers are split into two parts after extending out of the opening, the two parts forming an optical fiber flange at the opening of the housing and connecting two module units.

At least one embodiment of the present disclosure also provides a display device, comprising: a cover plate; a display panel under the cover plate, the display panel including a light transmission part; and the light guiding structure according to claim 1, provided at a side of the display panel away from the cover plate, the opening of the light guiding structure being aligned with the light transmission part.

For example, the display device further comprises a first adhesive layer configured to adhere the cover plate to the display panel. The end portions of the first optical fiber structure and the second optical fiber structure near the opening pass through the light transmission part and are bonded to the first adhesive layer.

For example, the light transmission part includes an edge fixed to the first optical fiber structure and the second optical fiber structure by a sealant.

For example, the display device further comprises a second adhesive layer. A side of the housing facing the display panel is bonded to the display panel by the second adhesive layer.

At least one embodiment of the present disclosure also provides a method of using the display device, comprising: acquiring an external environment image by the first optical fiber structure, and transmitting light incident into the light transmission part of the display device to the image collection module; and transmitting an image displayed by the image compensation module to the light transmission part of the display device by the second optical fiber structure.

For example, applying a second adhesive layer to allow side of the housing facing the display panel to be attached to the display panel by the second adhesive layer.

For example, the image collection module comprises a lens and a photosensitive sensor, signals transmitted from the first optical fiber structure passing through the lens to the photosensitive sensor.

BRIEF DESCRIPTION OF THE DRAWINGS

The embodiments of the present disclosure will be described in more detail below with reference to the accompanying drawings in order to enable a person of ordinary skill in the art to understand the embodiments of the present disclosure more clearly, in which.

DETAILED DESCRIPTION

Technical solutions of the embodiments will be described in a clearly and fully understandable way in connection with the drawings related to the embodiments of the disclosure. It is apparent that the described embodiments are just a part but not all of the embodiments of the disclosure. Based on the described embodiments herein, one of ordinary skill in the art can obtain other embodiment(s), without any creative work, which shall be within the scope of the disclosure.

Unless otherwise defined, all the technical and scientific terms used herein have the same meanings as commonly understood by one of ordinary skill in the art to which the present disclosure belongs. The terms, such as "first," "second," or the like, which are used in the description and the claims of the present disclosure, are not intended to indicate any sequence, amount or importance, but for distinguishing various components. The terms, such as "comprise/comprising," "include/including," or the like are intended to specify that the elements or the objects stated before these terms encompass the elements or the objects and equivalents thereof listed after these terms, but not preclude other elements or objects. The terms, "on," "under," "left," "right," or the like are only used to indicate relative position relationship, and when the position of the object which is described is changed, the relative position relationship may be changed accordingly.

The inventors have noticed that the design of "bangs" or "beauty arch" is generally used to realize the placement of cameras in a full screen, yet this design manner cannot realize the real full screen display. Moreover, the way of placing the lens through the opening of the screen to realize the off-screen camera shooting has disadvantages, namely, the opening area will lose the display function and the user experience is not ideal.

Figure 1A:
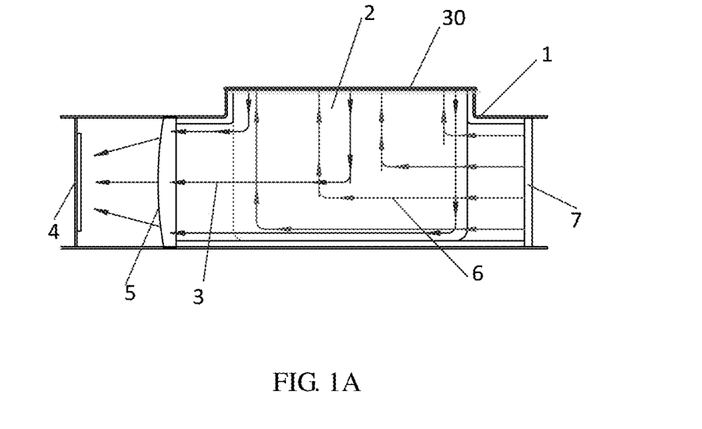
FIG. 1A shows a schematically structural diagram of a light guiding structure provided by an embodiment of the present disclosure.
Figure 1B:
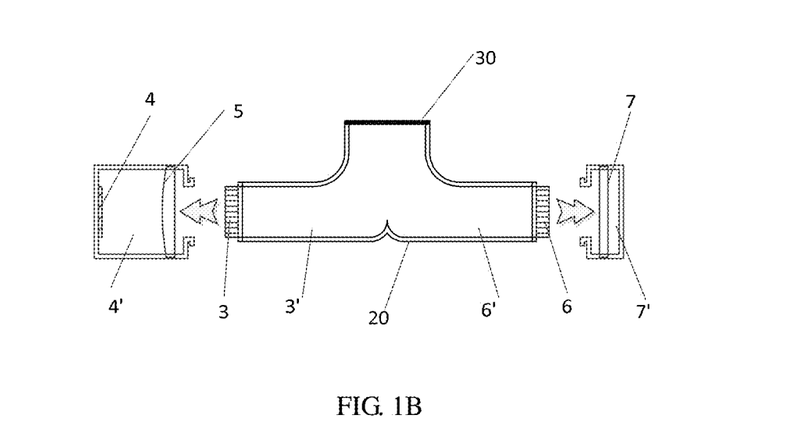
FIG. 1B shows a schematically exploded diagram of a light guiding structure provided by an embodiment of the present disclosure.

As shown in FIGS. 1A and 1B, an embodiment of the present disclosure provides a light guiding structure, comprising a housing 1, an opening 2 formed in the housing 1; a first optical fiber structure 3', an image collection module 4', a second optical fiber structure 6', and an image compensation module 7', which are arranged in the housing 1. The first optical fiber structure 3' is configured to transmit light incident into the opening 2 to the image collecting module 4'; and the second optical fiber structure 6' is configured to transmit an image displayed by the image compensation module 7' to the opening 2 of the housing 1.

The optical fiber(s) refer(s) to a fiber which can transmit light waves and various light signals.

As shown in FIG. 1B, an exploded structure of a light guiding structure according to an embodiment of the present disclosure is as shown, including a fiber structure part, an image collection module 4' and an image compensation module 7'. The image collection module 4' and the image compensation module 7' are located on two sides of the fiber structure part, and these three parts are provided in the housing 1. The fiber structure part includes a first fiber structure 3' and a second fiber structure 6'. The first optical fiber structure 3' and the second optical fiber structure 6' are both wrapped with a light shielding material 20. The first fiber structure 3' includes a first end at the opening 2 and a second end connected to the image collection module 4'. The second fiber structure 6' includes a first end located at the opening 2 and a second end connected with the image compensation module 7'. The first ends of the first fiber structure 3' and the second fiber structure 6' are formed as a fiber bundle flange 30 at opening 2 corresponding to the aperture of the display device (e.g., OLED). The image collection module 4' includes a photosensitive sensor 4 and a lens 5 (for example, a convex lens), and the lens 5 converges image information or a picture transmitted by the first optical fiber structure 3' incident from the aperture of the display device through the opening 2 of the housing to the optical sensor. 4. The image compensation module 7' includes an image compensation member 7. Image information or pictures from the image compensation module 7' are transmitted through the second fiber structure 6' to the opening 2 to exit. For example, the lens 5 and the photosensitive sensor 4 are integrated in the image collection module 4'.

Figure 2:
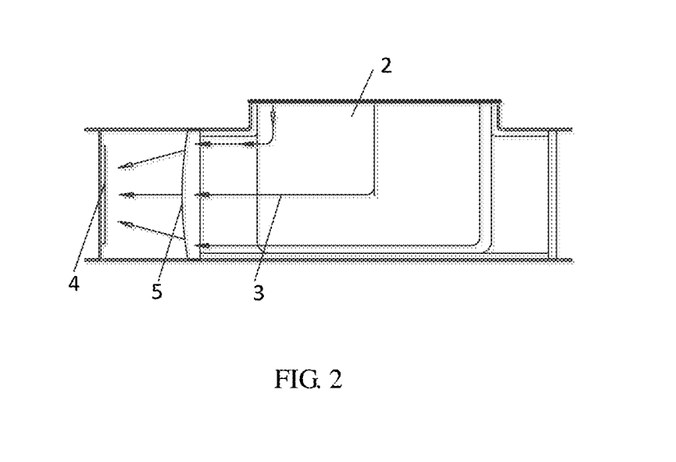
FIG. 2 shows a schematically structural diagram of a first optical fiber structure provided by an embodiment of the present disclosure.

In an example, the light guiding structure utilizes the characteristics of small diameter, flexibility and excellent light guiding property of optical fibers, and uses optical fibers to solve the picture transmission problem. The light guiding structure solves the problems of acquiring images from the opening 2 and conducting images displayed by the compensation module 7' to the opening 2 for display through two groups of optical fibers arranged in an array, respectively. The first optical fiber structure 3' and the second optical fiber structure 6' conduct light (e.g., picture, image information, or the like) in different directions. As shown in FIG. 2, a first end portion of the first optical fiber structure 3' near the opening 2 passes through the opening 2, and the other end portion, namely a second end, is connected to (e.g., bonded to) the photosensitive sensor 4. In this way, the first optical fiber structure 3' conducts light incident into the opening 2 to the photosensitive sensor 4. In other words, conducting light to the photosensitive sensor 4 through the first optical fiber structure is equivalent to the effect of arranging the photosensitive sensor 4 in the opening 2.

Figure 3:
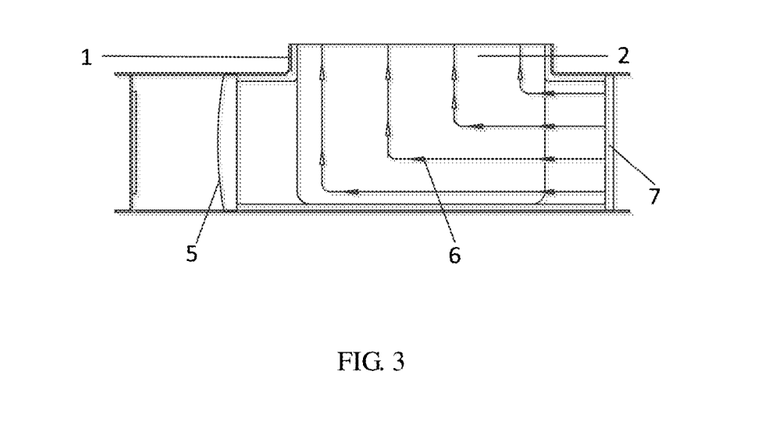
FIG. 3 shows a schematically structural diagram of a second optical fiber provided by an embodiment of the present disclosure.

Similarly, as shown in FIG. 3, the first end portion of the second optical fiber structure 6' near the opening 2 passes through the opening 2 and the other end portion, namely the second end, is connected to (e.g., bonded to) the compensation module 7'. In this way, the second optical fiber structure 6' conducts the image displayed by the image compensation module 7' to the opening 2, that is, this is equivalent to the effect of arranging the compensation module 7' in the opening 2.

For example, the image collection module 4' and thus photosensitive sensor 4 and the compensation module 7' and thus the image compensation member 7 in the light guiding structure may be arranged at the same side or at different sides, but the embodiments of the present disclosure are not limited thereto. For example, considering the pursuit of ultra-thin characteristic of the light guiding structure and the simplicity of the first optical fiber structure 3' and the second optical fiber structure 6' as much as possible, in an example, the photosensitive sensor 4 and the compensation module 7 in the housing 1 of the light guiding structure are arranged at two sides of the opening 2 of the housing, respectively.

To improve the photosensitive characteristics of the photosensitive sensor 4, in an exemplary embodiment, the light guiding structure further comprises a convex lens 5 in the housing 1 configured to focus light transmitted by the first optical fiber structure 3' to the photosensitive sensor 4.

Figure 4:
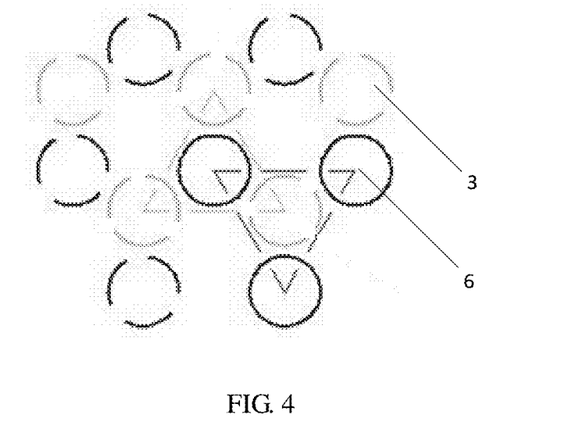
FIG. 4 shows a schematic diagram of an arrangement of optical fibers provided by an embodiment of the present disclosure.
Figure 5:
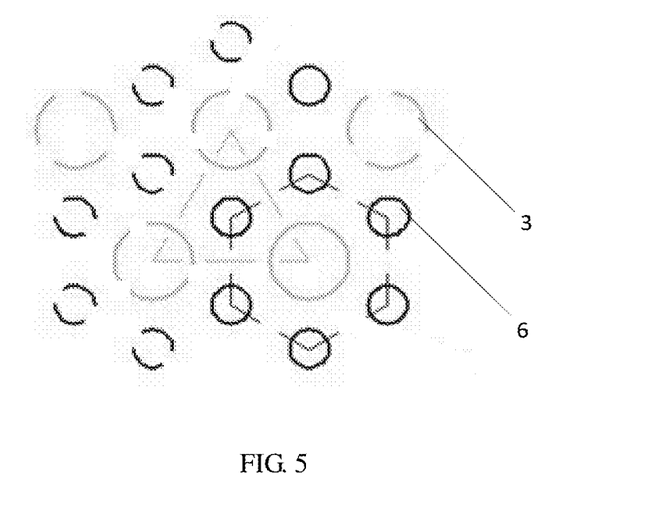
FIG. 5 shows a schematic diagram of an arrangement of optical fibers provided by another embodiment of the present disclosure.

In another embodiment, the requirement of the light guiding structure on image acquisition and picture compensation resolution is realized by changing the arrangement of optical fibers. As shown in FIG. 4, the first optical fiber structure 3' and the second optical fiber structure 6' comprise a plurality of first optical fibers 3 and a plurality of second optical fibers 6, respectively, the plurality of first optical fibers 3 and the plurality of second optical fibers 6 are arranged at intervals near an end portion of the opening 2, and the other end portions of the plurality of first optical fibers 3 and the plurality of second optical fibers 6 are bonded to the photosensitive sensor 4 and the compensation member 7, respectively. That is, the amount of the first optical fibers 3 and the amount of the second optical fibers 6 are the same, and the first optical fibers 3 and the second optical fibers 6 are assigned with a same resolution equally, and the image acquisition and the picture compensation have the same resolution. As shown in FIG. 5, for example, the plurality of first optical fibers 3 and the plurality of second optical fibers 6 are annularly arranged in which a multiple of first optical fibers 3 surround one second optical fiber 6 or a multiple of second optical fibers 6 surround one first optical fiber 3 at end portions (first ends) of these optical fibers near the opening 2, and the other end portions (second ends) of the plurality of first optical fibers 3 and the plurality of second optical fibers 6 are connected to the photosensitive sensor 4 and the compensation member 7, respectively.

For example, the plurality of first optical fibers 3 and the plurality of second optical fibers 6 are regularly arranged, and the first ends of the plurality of first optical fibers 3 and the plurality of second optical fibers 6 are split into two parts after extending out of the opening, the two parts forming an optical fiber flange at the opening of the housing and configured to connect two module units.

Exemplarily, the connection can be realized by bonding or attaching.

The amount/number of the first optical fibers 3 is different from the amount/number of the second optical fibers 6. For example, if the image acquisition requirement is higher than the picture compensation requirement, the number of the first optical fibers 3 is greater than the number of the second optical fibers 6, and the first optical fibers 3 are arranged in a circle and surround the second optical fiber 6 which is the center of the circle. If the picture compensation requirement is higher than the image acquisition requirement, the second optical fibers 6 are arranged in a circle and surround the first optical fiber 3 which is the center of the circle. In this way, the requirements of the display device for different resolutions of image acquisition and picture compensation can be realized.

Figure 6:
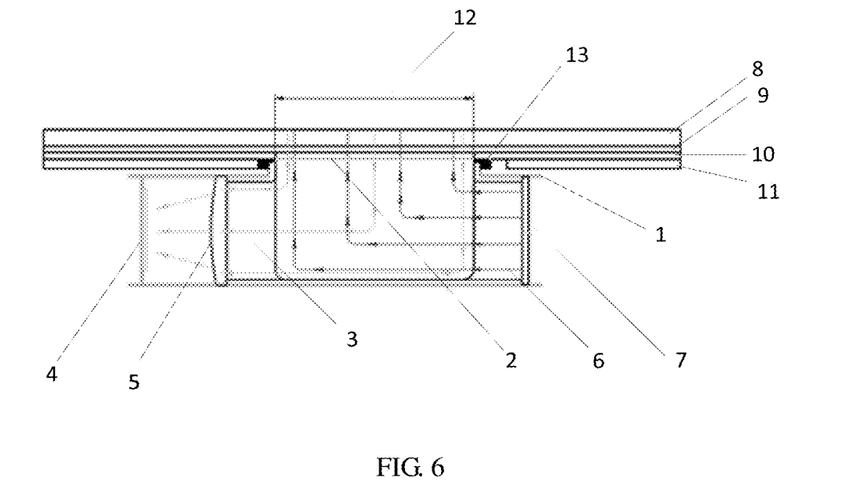
FIG. 6 shows a schematically structural diagram of a display device provided by an embodiment of the present disclosure.

As shown in FIG. 6, an embodiment of the present disclosure also provides a display device, comprising a cover plate 8, a display panel 10 under the cover plate 8, the display panel 10 being provided with a light transmission part 12, and a light guiding structure arranged at a side of the display panel 10 away from the cover plate 8. The opening 2 of the light guiding structure is aligned with the light transmission part 12 of the display panel 10. For example, the display device can be an OLED.

For example, the display device can be a device of a liquid crystal panel, electronic paper, an organic light-emitting diode panel, a mobile phone, a tablet computer, a television, a display, a notebook computer, a digital photo frame, a navigator, and any other devices with display function.

Figure 7:
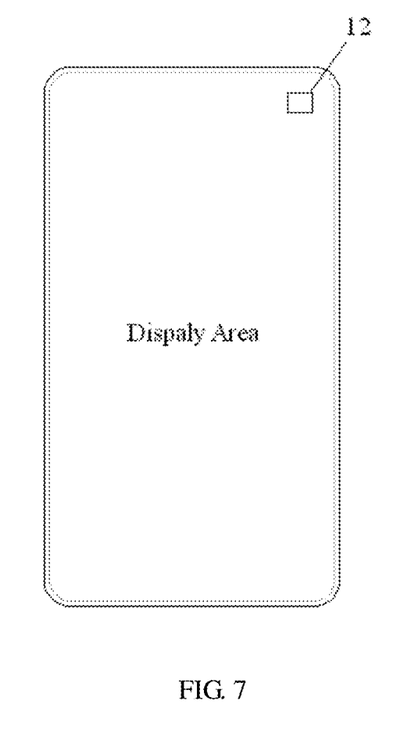
FIG. 7 shows a schematic plan diagram of a display device (e.g., a cellphone) provided by an embodiment of the present disclosure.

In an example, as shown in FIG. 7, a full-screen cellphone is illustrated as an example. The display panel of the full-screen cellphone is provided with a light transmission part 12, which can be a light transmission hole provided on the display panel, for example, a hole provided on the display panel for placing a front camera in those "bangs" designs. The transmission part can also be a transparent area on the display panel, for example, no organic functional layer is provided at a position corresponding to the light transmission part on the organic light-emitting diode display (OLED) panel, and a display blank area is provided on the display panel. In this way, the corresponding light transmission function can be realized, the real full-screen display of the cellphone can be realized, and the unreal full-screen display with "bangs" designs can be avoided.

The light transmission part 12 on the display panel is aligned with the opening 2 of the housing of the light guiding structure. That is, on a full-screen cellphone, the first optical fibers 3 conduct light incident into the light transmission part 12 to the photosensitive sensor 4, and the second optical fibers 6 conduct an image displayed on the compensation member 7 to the cover plate 8 corresponding to the light transmission part 12.

In the present embodiment, the light transmission part 12 is a light transmission hole provided on the display panel. When a full-screen cellphone needs to acquire an image, for example, unlocking the cellphone by facial recognition or taking a self-portrait photograph, the first optical fibers 3 acquire light incident into the light transmission part 12 and conduct the light to the photosensitive sensor 4, i.e., arranging the photosensitive sensor 4 in the light guiding structure with the light conducted by the first optical fiber 3 is equivalent to arranging the photosensitive sensor 4 in the light transmission part 12. Moreover, when the cellphone needs to display a picture, the image to be displayed is displayed on the compensation member 7, and the image displayed by the compensation member 7 is conducted to the light transmission part 12 and projected on the cover plate 8 through the second optical fibers 6, i.e., the effect of arranging the compensation member 7 in the light transmission part 12 is realized by arranging the compensation member 7 at the second ends of the second optical fibers 6 which conduct light from the compensation member 7 to the light transmission part 12 of the display panel. That is, the first optical fibers 3 and the second optical fibers 6 are equivalent to corresponding pixel points at the light transmission part 12, and multiplexing of the light transmission part 12 is realized through the two lines of optical fibers, so that the image acquisition function and the image display function are both considered, and a full screen display function of a full screen cellphone is truly realized.

In an embodiment, as shown in FIG. 6, the display device further comprises a first adhesive layer 9 for adhering the cover plate 8 and the display panel 10; the end portions of the first optical fiber 3 and the second optical fiber 6 near the light transmission part 12 pass through the light transmission part 12 and are bonded to the first adhesive layer 9. For example, the first optical fibers 3 and the second optical fibers 6 are prepared in the form of fiber bundles, and fibers of the first optical fibers 3 and the second optical fibers 6 are bonded together with a fixed adhesive. The fiber bundles are cut off to form a flange end face, and the flange end face is bonded to the optical adhesive to form a flange 30.

In an embodiment, the edge of the light transmission part 12 is fixed to the first optical fibers 3 and the second optical fibers 6 through a sealant 13, considering the tightness and fixing of the light transmission part 12 to the first optical fibers 3 and the second optical fibers 6. The sealant 13 can also improve the optical fiber acquisition effect of the first optical fibers 3 and the compensation effect of the display image of the compensation module 7' conducted by the second optical fibers 6.

In another embodiment, in order to improve the stability of the light guiding structure and the display panel, the side of the housing 1 facing the display panel 10 is attached to the display panel 10 by a second adhesive layer 11. The second adhesive layer 11 seals and fixes the light guiding structure and the display panel 10, and it can block light to prevent light under the display panel 10 from transmitting through the display panel, to allow the display panel 10 to display pictures uniformly. For example, the display panel 10 is an electroluminescent diode display (OLED) panel. If no second adhesive layer 11 is provided for blocking light, light rays at the rear end of the display panel 10 will penetrate into the front end, resulting in uneven image display. Similarly, if the display panel 10 is a liquid crystal display panel, light rays at the rear end of the display panel 10 may enter the backlight source, resulting in uneven image display at the front end of the display panel 10, while the uniform image display can be realized by providing the second adhesive layer 11.

Considering the actual application scenario of the display device, for example, the light transmission part 12 may be disposed at the edge of the display area of the display panel, but the embodiments of the present disclosure are not limited thereto.

As shown in FIG. 7, on the panel of a display device, such as a mobile phone, the light transmitting part 12 is provided at a corner of the panel, corresponding to the opening 2 of the housing 1 of the light guiding structure. However, embodiments of the present disclosure are not limited thereto.

Corresponding to the display device provided in the above embodiments, an embodiment of the present disclosure also provides a method of using the display device. Because the method provided in the embodiments of the present application corresponds to the display device provided in the above embodiments, the embodiments and examples as well as implementation modes described above are also applicable to the method in the embodiment.

Figure 8:
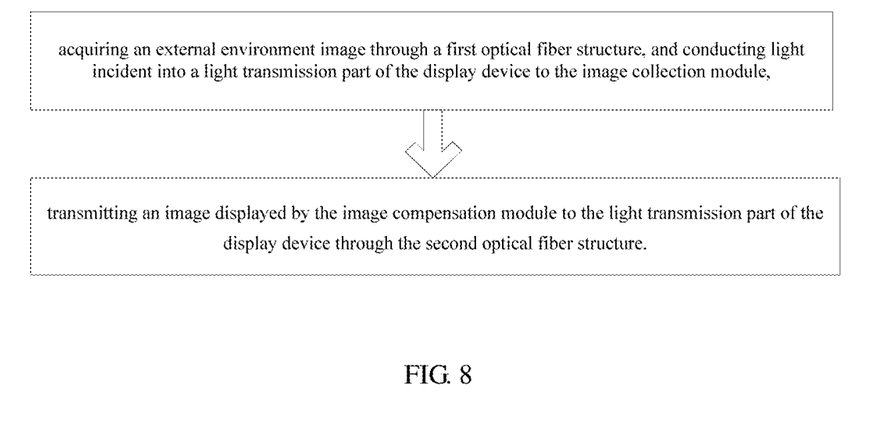
FIG. 8 shows a flowchart of a method of using the display device provided by an embodiment of the present disclosure.

As shown in FIG. 8, for example, a method of using the display device provided by an embodiment of the present disclosure comprises: acquiring an external environment image through a first optical fiber structure 3', and transmitting light incident into a light transmission part 12 of the display device to the image collection module 4'; and transmitting an image displayed by the image compensation module 7' to the light transmission part 12 of the display device through the second optical fiber structure 6'. That is, when the display device acquires an external environment image through the light transmission part 12, light rays incident into the light transmission part 12 are transmitted to the photosensitive sensor 4, and when the display device displays an image, the image displayed by the compensation module 7' is transmitted to a cover plate 8 corresponding to the light transmission part 12, so that the full-screen cellphone realizes the functions of image acquisition and image display at the same time.

The embodiments of the present disclosure provide a light guiding structure, a display device and a method of using the same. By arranging a light transmission part on the screen and a light guiding structure under the screen, on one hand, light incident from the light transmission part of the display screen is transmitted to a photosensitive sensor through a group of optical fibers by utilizing the excellent light transmission property of the optical fibers to realize the acquisition of external images, and at the same time, a compensation image corresponding to the light transmission part is transmitted and interpolated to the screen through another group of optical fibers connected to an image compensation module. In this way, the hiding of a lens or a camera under the screen and a real full screen display are realized, which improves user's experience and avoids the problem that the full screen display device cannot take into account both the image acquisition and the display.

Herein, the terms 'light,' 'image,' 'picture,' or the like may be exchanged and may refer to any information or signals which can be transmitted through optical fibers or the like.

The foregoing is only the exemplary embodiments of the present disclosure, and the scope of the present disclosure is not limited thereto. A person of ordinary skill in the art can make various changes and modifications without departing from the present disclosure, and such changes and modifications shall fall into the scope of the present disclosure.

What is claimed is:

1. A light guiding structure, comprising:
   a housing including an opening;
   a first optical fiber structure, an image collection module, a second optical fiber structure, and an image compensation module in the housing;
   wherein the first optical fiber structure is configured to transmit light incident into the opening to the image collection module; and
   the second optical fiber structure is configured to transmit an image displayed by the image compensation module to the opening;
   first optical fiber structure comprises a plurality of first optical fibers,
   and the second optical fiber structure comprises a plurality of second optical fibers,
   the plurality of first optical fibers including first ends near the opening and the plurality of second optical fibers including first ends near the opening,
   the plurality of first optical fibers includes second ends connected to the image collection module, and the plurality of second optical fibers includes second ends connected to the image compensation member, respectively;

a first angle formed between a first end of the first optical fiber structure and a second end of the first fiber structure along their respective extending directions is not zero or 180 degrees, and a second angle formed between a first end of the second optical fiber structure and a second end of the second fiber structure along their respective extending directions is not zero or 180 degrees.

2. The light guiding structure according to claim 1, wherein the image collection module comprises a photosensitive sensor, and the image compensation module comprises an image compensation member.

3. The light guiding structure according to claim 2, wherein the first optical fiber structure and the second optical fiber structure are provided under the opening of the housing, and the photosensitive sensor and the image compensation member are provided under the opening of the housing at positions beyond both the first optical fiber structure and the second optical fiber structure.

4. The light guiding structure according to claim 2, wherein the image collection module further comprises a convex lens configured to focus light transmitted by the first optical fiber structure to the photosensitive sensor.

5. The light guiding structure according to claim 3, wherein
all of the first ends being arranged at intervals.

6. The light guiding structure according to claim 3, wherein
the first optical fiber structure comprises a plurality of first optical fibers; and
the second optical fiber structure comprises a plurality of second optical fibers;
near the opening of the housing, the first ends of the plurality of first optical fibers surrounding one of the first ends of the plurality of second optical fibers, or the first ends of the plurality of second optical fibers surrounding one of the first ends of the plurality of first optical fibers, to form a ring arrangement; and
the second ends of the plurality of first optical fibers being connected to the photosensitive sensor, and the second ends of the plurality of second optical fibers being connected to the image compensation member.

7. The light guiding structure according to claim 3, wherein the image collection module further comprises a convex lens configured to focus light transmitted by the first optical fiber structure to the photosensitive sensor.

8. The light guiding structure according to claim 5, wherein the second ends of the plurality of first optical fibers are bonded to the photosensitive sensor, and the second ends of the plurality of second optical fibers are bonded to the image compensation member.

9. The light guiding structure according to claim 6, wherein the second ends of the plurality of first optical fibers are bonded to the photosensitive sensor, and the second ends of the plurality of second optical fibers are bonded to the image compensation member.

10. The light guiding structure according to claim 9, wherein
the plurality of first optical fibers and the plurality of second optical fibers are arranged regularly, and the first ends of the plurality of first optical fibers and the plurality of second optical fibers are split into two parts after extending out of the opening of the housing, and the two parts forming an optical fiber flange at the opening of the housing.

11. A display device, comprising:
a cover plate;
a display panel under the cover plate, the display panel including a light transmission part; and
a light guiding structure provided at a side of the display panel away from the cover plate, wherein the light guiding structure comprises:
a housing including an opening;
a first optical fiber structure, an image collection module, a second optical fiber structure, and an image compensation module in the housing;
wherein the first optical fiber structure is configured to transmit light incident into the opening to the image collection module; and
the second optical fiber structure is configured to transmit an image displayed by the image compensation module to the opening;
the first optical fiber structure comprises a plurality of first optical fibers,
the second optical fiber structure comprises a plurality of second optical fibers,
the plurality of first optical fibers including first ends near the opening and the plurality of second optical fibers including first ends near the opening,
the plurality of first optical fibers includes second ends connected to the image collection module, and the plurality of second optical fibers includes second ends connected to the image compensation member, respectively;
a first angle formed between a first end of the first optical fiber structure and a second end of the first fiber structure along their respective extending directions is not zero or 180 degrees, and a second angle formed between a first end of the second optical fiber structure and a second end of the second fiber structure along their respective extending directions is not zero or 180 degrees; and
the opening of the housing being aligned with the light transmission part.

12. The display device according to claim 11, further comprising:
a first adhesive layer configured to adhere the cover plate to the display panel,
wherein end portions of the first optical fiber structure and the second optical fiber structure near the opening pass through the light transmission part and are bonded to the first adhesive layer.

13. The display device according to claim 12, wherein the light transmission part includes an edge fixed to the first optical fiber structure and the second optical fiber structure by a sealant.

14. The display device according to claim 13, further comprising a second adhesive layer, wherein a side of the housing facing the display panel is bonded to the display panel by the second adhesive layer.

15. A method of using the display device according to claim 11, comprising:
acquiring an external environment image by the first optical fiber structure, and transmitting light incident into the light transmission part of the display device to the image collection module; and
transmitting an image displayed by the image compensation module to the light transmission part of the display device by the second optical fiber structure.

16. The method according to claim 11, further comprising applying a second adhesive layer to allow a side of the housing facing the display panel to be attached to the display panel by the second adhesive layer.

17. The method according to claim 12, further comprising applying a second adhesive layer to allow a side of the housing facing the display panel to be attached to the display panel by the second adhesive layer.

18. The method according to claim 15, wherein the image collection module comprises a lens and a photosensitive sensor, signals transmitted from the first optical fiber structure passing through the lens to the photosensitive sensor.

19. The light guiding structure according to claim 1, wherein the first angle is about 90 degrees, and the second angle is about 90 degrees.

20. The display device according to claim 11, wherein the first angle is about 90 degrees, and the second angle is about 90 degrees.

\* \* \* \* \*